United States Patent [19]

Erkelenz

[11] 4,403,540  
[45] Sep. 13, 1983

[54] BACON GRILL

[75] Inventor: Johannes F. Erkelenz, Seoul, Rep. of Korea

[73] Assignee: Top-Qua & Co., Ltd., Victoria, Hong Kong

[21] Appl. No.: 364,445

[22] Filed: Apr. 1, 1982

[51] Int. Cl.³ ............................................ A47J 37/10
[52] U.S. Cl. .................................. 99/375; 99/421 R; 99/425; 99/427; 99/445; 99/446
[58] Field of Search .................. 99/419, 422, 425, 445, 99/446, 444, 449

[56] References Cited

U.S. PATENT DOCUMENTS

| 541,534 | 6/1895 | Haffcke | 99/446 |
| 1,690,570 | 11/1928 | Dalbey | 99/425 |
| 2,309,784 | 2/1943 | Peron | 99/425 X |
| 3,407,723 | 10/1968 | Varkala | 99/425 X |
| 3,466,998 | 9/1969 | Musgrove | 99/390 X |

Primary Examiner—Billy J. Wilhite
Assistant Examiner—Christine A. Peterson
Attorney, Agent, or Firm—Kane, Dalsimer, Kane, Sullivan and Kurucz

[57] ABSTRACT

The disclosure is of an electric grill assembly for broiling bacon. The grill comprises a housing, defining an inner chamber; lid means giving access to the chamber; heating elements positioned within the chamber; and a removable grill member which is positioned within the assembly for association with the heating elements. The grill member operates for broiling in an inclined position to facilitate the broiling process and in a horizontal position to facilitate removal from the assembly.

3 Claims, 6 Drawing Figures

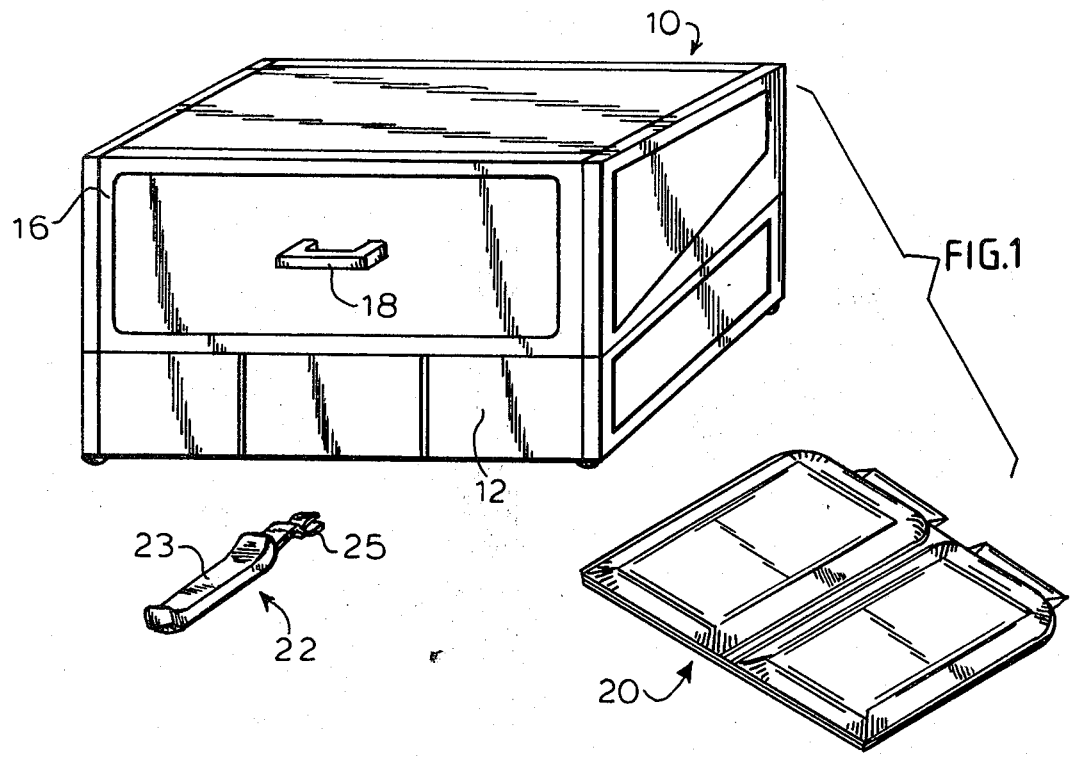
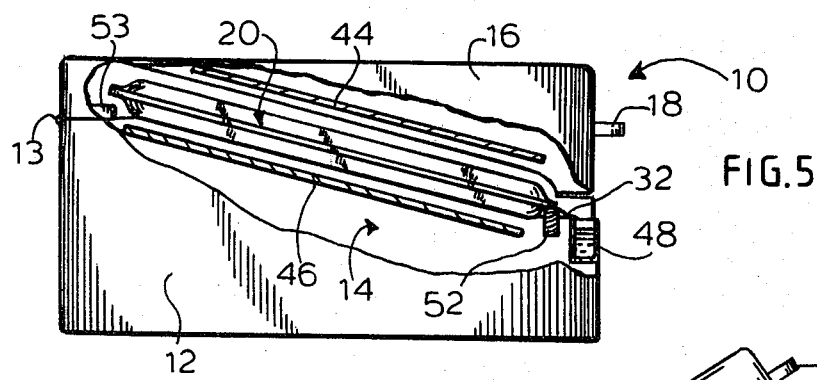
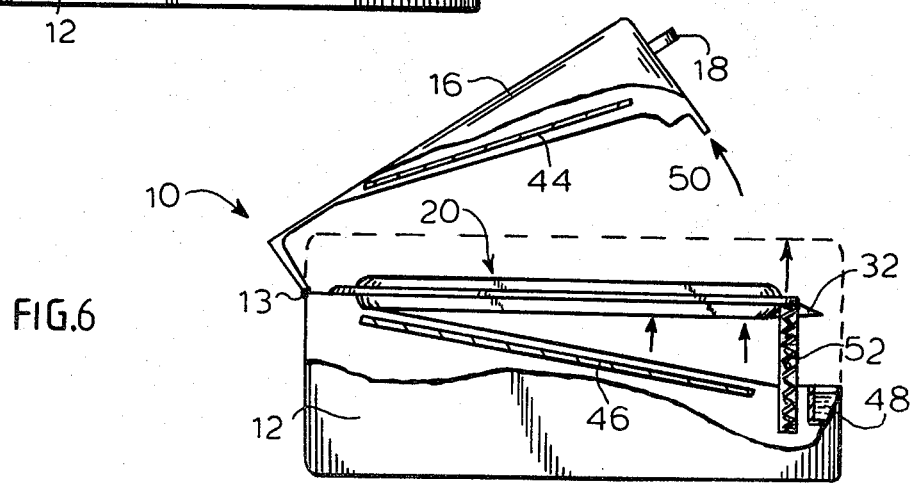

BACON GRILL

BACKGROUND OF THE INVENTION

1. Field of the Invention

The invention relates to broiler grills and more particularly relates to an improved bacon grill.

2. Brief Description of the Prior Art

Representative of prior art descriptions of broilers and grills are those found in U.S. Pat. Nos. 1,690,570; 3,466,998; and 2,309,784.

SUMMARY OF THE INVENTION

The invention comprises an electric grill assembly for broiling bacon. The grill comprises a housing, which defines an inner chamber; lid means giving access to the chamber; a first heating element positioned in the chamber; a second heating element positioned on the inner surface of the lid and spaced apart from the first heating element; a removable grill member; means for holding the grill member between the first and the second heating element, in a first horizontal position when the lid is open and in a second, inclined position when the lid is closed; and a grease collector situated to receive liquid grease from the inclined grill member; said grill member comprising an upper plate and a mating lower plate, the lower plate having a corrugated cooking surface, a non-stick coating and spikes to hold bacon in place; said grill member being removable from its position between the first and second heating elements when the lid is open.

BRIEF DESCRIPTION OF THE DRAWINGS

FIG. 1 is a view in perspective of an embodiment assembly of the invention, including removable parts.

FIG. 5 is a side elevation of the assembly shown in FIG. 1, partially cut away to show the grill member mounted therein.

FIG. 6 is a view as in FIG. 5 but with the lid component of the assembly raised.

DETAILED DESCRIPTION OF THE PREFERRED EMBODIMENTS OF THE INVENTION

Figure 2:
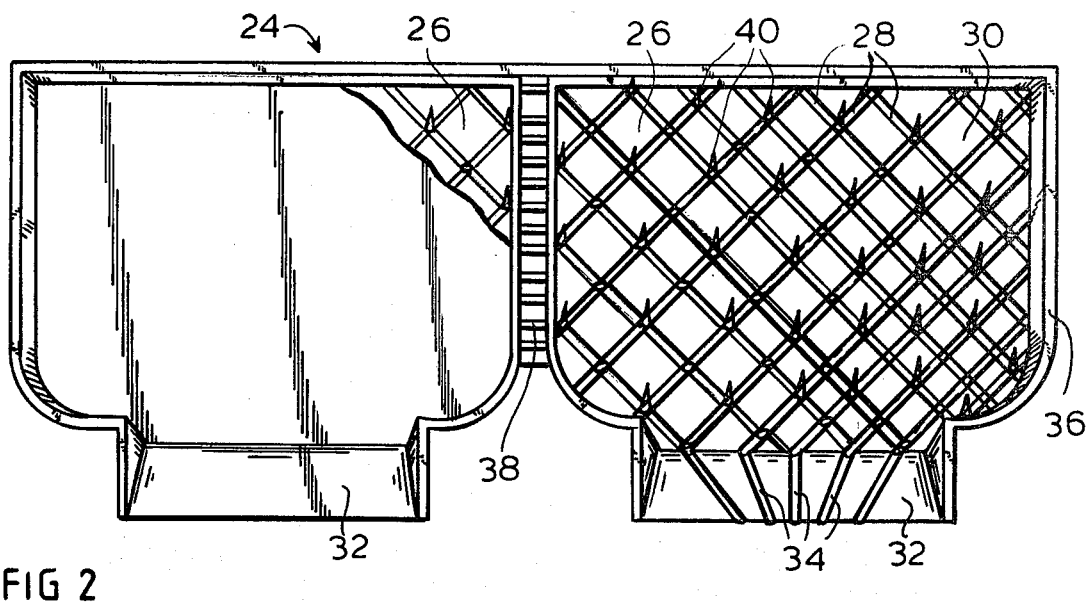
FIG. 2 is a top plan view of the lower part of an embodiment grill member employed in the assembly of FIG. 1.

FIG. 1 is a view in perspective of an embodiment assembly 10 of the invention. The assembly 10 comprises a housing 12 enclosing an interior space (not seen in FIG. 1). A lid 16 may be raised by grasping and pulling upward on handle 18 to gain access to the interior space 14. The lid 16 is hinged on housing 12 at the rear of the assembly 10 on hinge 13 (not seen in FIG. 1). The housing 12 and hinged lid 16 may be fabricated from any conventional materials, preferably heat resistant metals or high temperature resistant polymeric resins and the like.

A part of the assembly 10 is a 2-component grill member 20 and a removable handle 22 used to place the grill member 20 within the interior space 14 of the assembly 10 and to remove it from the space 14 as will be described more fully hereinafter.

Referring now to FIG. 2, one may see the lower component or part of grill member 20 as shown in a top plan view. The lower or bottom part of the grill member 20 comprises a pan 24 having a pan surface 26 which is criss-crossed with a series of channels 28 separated by raised portions 30. The channels 28 intersect each other and lead ultimately in a drainage pattern leading towards trough 32 which includes channels 34. Encircling and defining the periphery of the pan surface 26 are sidewalls 36 which serve to confine and enclose materials deposited upon the pan surface 26. The lower part 24 of grill member 20 as shown in FIG. 2 is actually made up of twin pan surfaces 26, and troughs 32 separated by a bridge 38. This particular dual arrangement is advantageously employed in commerical broiling enterprises where it may be advantageous to separate portions of broiling bacon. However, those skilled in the art will readily appreciate that a single pan surface 26 with a single trough 32 may also be employed when desired.

At spaced intervals rising from the pan 26 are spikes 40 to impale and hold in place pieces of bacon for broiling. Such impalement limits shrinkage of the bacon.

Figure 3:
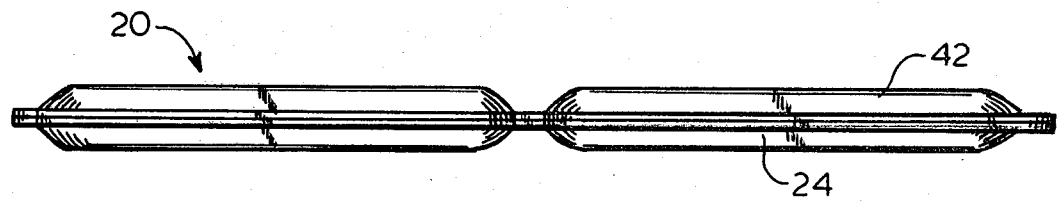
FIG. 3 is a side elevation of the lower portion of the grill member shown in FIG. 2, with the upper portion of the grill member mated thereto.

FIG. 3 is a side elevation from the front, showing the lower grill part 24 covered with a mating cover 42 including similar spikes 40 to complete the grill member 20. The grill member 20 may be fabricated from any conventional, thermally transparent or heat conductive material. Preferably, grill member 20 is fabricated from cast iron or steel.

Figure 4:
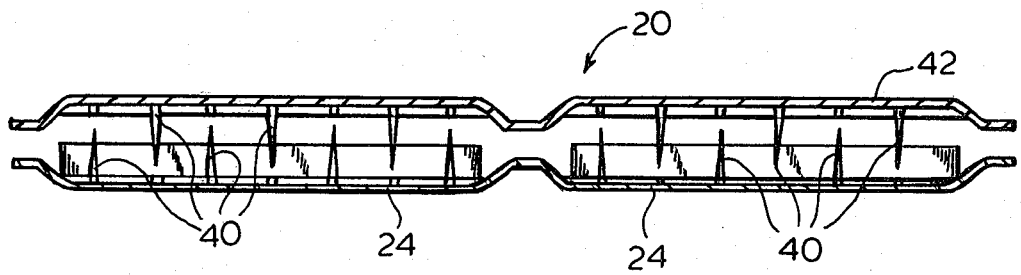
FIG. 4 is a cross-sectional side elevation of the embodiment grill member shown in FIG. 3.

FIG. 4 is a cross sectional, side elevation of the grill member 20 as shown in FIG. 3. In FIG. 4, further details of the construction of the grill member 20 may be seen and appreciated. In the FIG. 4, the cover 42 has been partially lifted from the bottom portion 24 to show the association of parts 24 and 42 in a different way.

FIG. 5 is a side elevation of the assembled assembly 10 shown in FIG. 1, partially cut away to show the interior space 14 and grill member 20 emplaced therein. The grill member 20 may be supported in its position between heating elements 44, 46 by a peripheral flange 53 fastened to the interior rearwall of the housing 12 and spring 52. In the FIG. 5, the lid 16 of the assembly 10 is in a closed position. Secured to the inner surface of lid 16 is a heater element 44. Opposite to and spaced apart from heating element 44 is a lower heating element 46 mounted within the space 14. The means of mounting and/or securing the heating elements 44, 46 is not important and those skilled in the art will know how to do so. A particular means is not shown in the figures, to simplify viewing. The heating elements 44, 46 are within an electrical circuit connected to a power source for energizing the heating elements 44, 46. The electrical circuit may be a conventional one and is also not shown in the FIG. 5. It will be noted that the grill member 20 is mounted between heating elements 44, 46 in an inclined position with the trough 32 positioned to deliver fluid materials from pan surface 26 to a grease collecting receptacle 48. Thus, when bacon strips are affixed to the spikes 40 within the grill member 20 and grill member 20 is positioned as shown in FIG. 5 between heating elements 44, 46 the bacon will be grilled upon energizing of the heating elements 44, 46. The thermally conductive grill member 20 transfers heat received from the heating elements 44, 46 to the contained bacon strips. Because the bacon is firmly affixed to the spikes 40, the tendency of the broiling bacon to shrink is defeated. During the broiling process, liquified fats from the bacon drain over the surface 26 through the channels 28 and into the grease collecting receptacle 48 which is removable to dispose of collected grease. All of the broiling occurs within the interior space 14 when the lid 16 is in a closed position as shown in FIG. 5. Conventional safety devices such as circuit breakers may be associated with the closed lid 16 to assure that the circuits energizing heating elements 44, 46 are only closed and active when lid 16 is closed. The safety devices can interrupt electrical supply when lid 16 is raised, de-energizing the heating elements 44, 46. Such safety components are not part of the invention and are not shown in the figures accompanying this application. Timer devices may also be included in the electrical circuitry.

An important feature in the assembly 10 of the invention is illustrated in FIG. 6, the side elevation of the assembly 10 as shown in FIG. 5 but with lid 16 raised. The lid 16 as shown in FIG. 5, through detent 50 compresses and holds down spring 52 so that the grill member 20 is in the inclined position shown in FIG. 5. However, with lid 16 raised as shown in FIG. 6, the spring 52 is allowed to decompress so as to raise the forward portion of supported grill member 20 so that grill member 20 is in a horizontal position. In this horizontal position, the grill member 20 ceases to discharge liquified fats (grease) to the collecting receptacle 48 and the grill member 20 may then be safely removed from space 14. Removal may be by attachment of the handle 22 to the trough 32 portion of the lower part 24 of grill member 20. The handle 22 includes a shank 23 for hand gripping and jaws 25 for gripping the trough 32. In this manner, the grill member 20 with its cooked contents is quickly removed from the broiler assembly 10 so that the cover 42 may be removed and the cooked bacon removed from its impalement upon spikes 40. A second grill member 20 with freshly impaled, uncooked bacon strips on spikes 40 can be quickly inserted into the space 14 for repeating the cooking process as described above. With a freshly loaded grill member 20 inserted in space 14, lid 16 may be closed to again activate or energize the heating elements 44, 46 for broiling the enclosed freshly charged bacon strips.

The removability of the grill member 20 from the assembly 10 greatly facilitates and speeds up continuous broiling operations, which is particularly valuable to the commercial use of the assembly 10. It also facilitates cleaning of the parts of assembly 10 which are exposed to the broiling bacon and therefore most in need of cleaning. The movement of the grill member 20 from an inclined cooking position (which is best for broiling and draining grease) to a horizontal position for removal is also advantageous, facilitating insertion and removal of the bacon and the grill member 20.

What is claimed:

1. An electric grill assembly for broiling bacon, which comprises; a housing defining an inner chamber; a lid hinged to the housing and giving access to the chamber; a first heating element positioned in the chamber; a second heating element positioned on the inner surface of the lid and spaced apart from the first heating element; means for energizing the heating elements; means for holding the grill member between the first and second heating elements, in a first horizontal, non-cooking position when the lid is open and in a second, inclined, cooking position when the lid is closed; means in the chamber for moving the grill member from the first to the second position when the lid is closed and for returning the grill member from the second to the first position when the lid is opened; and a grease collector situated to receive liquid grease from the inclined grill member; said grill member comprising an upper covering plate and a mating lower plate, the lower plate having a corrugated cooling surface; a non-stick coating and spikes to hold the bacon in place; said grill member being removable from its position between the first and second heating elements when the lid is open.

2. The assembly of claim 1 wherein the means for holding comprises a compressible spring mounted to hold the end of the grill member in a raised position.

3. The assembly of claim 1 which further comprises a detachable handle for holding the grill member.

* * * * *